(12) United States Patent
Kiyokawa et al.

(10) Patent No.: US 10,031,227 B2
(45) Date of Patent: Jul. 24, 2018

(54) PARKING ASSIST SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Yusuke Kiyokawa, Nagoya (JP); Masaya Kato, Toyokawa (JP); Hiroyuki Tachibana, Okazaki (JP); Tomohisa Yamashita, Toyohashi (JP); Tomoyuki Matsuba, Obu (JP); Motonari Obayashi, Nagakute (JP); Hironobu Ishijima, Toyota (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 218 days.

(21) Appl. No.: 14/850,304

(22) Filed: Sep. 10, 2015

(65) Prior Publication Data

US 2016/0078764 A1 Mar. 17, 2016

(30) Foreign Application Priority Data

Sep. 12, 2014 (JP) ................................ 2014-186823

(51) Int. Cl.
*G08G 1/14* (2006.01)
*G01S 15/93* (2006.01)
(Continued)

(52) U.S. Cl.
CPC ........... *G01S 15/931* (2013.01); *B60W 30/06* (2013.01); *G08G 1/168* (2013.01); *G01S 2015/932* (2013.01)

(58) Field of Classification Search
CPC ........ G01C 21/00; G08G 1/143; G08G 1/168; G01S 15/931; G01S 2015/932; B60W 30/06; B60R 1/00
See application file for complete search history.

(56) References Cited

U.S. PATENT DOCUMENTS 8,988,250 B2 * 3/2015 Suzuki ...................... B60R 1/00
340/932.2
2009/0085771 A1 * 4/2009 Wu .................... B62D 15/0285
340/932.2
(Continued)

FOREIGN PATENT DOCUMENTS

| JP | 2009-101984 A | 5/2009 |
| JP | 2012-116282 A | 6/2012 |
| JP | 2014-076697 A | 5/2014 |

OTHER PUBLICATIONS

Communication dated Jul. 26, 2016, from the Japanese Patent Office in counterpart Japanese application No. 2014-186823.

*Primary Examiner* — Thomas G Black
*Assistant Examiner* — Ce Li Li
(74) *Attorney, Agent, or Firm* — Sughrue Mion, PLLC

(57) ABSTRACT

A parking assist system includes an electronic control unit. The electronic control unit is configured to detect an obstacle, detect a boundary of a parking space, determine a target position to which a vehicle moves, and, when the vehicle is allowed to be located in a third area in which a first area and a second area overlap with each other, be allowed to determine the target position in the third area. The first area is an area across a limit line from the obstacle. The limit line is set substantially along an outer periphery of the obstacle at a position spaced a predetermined distance from the obstacle outward of the obstacle. The second area is an area out of the boundary.

4 Claims, 12 Drawing Sheets

(51) Int. Cl.
   *B60W 30/06*    (2006.01)
   *G08G 1/16*    (2006.01)

(56) References Cited

U.S. PATENT DOCUMENTS

| | | | |
|---|---|---|---|
| 2010/0231416 A1* | 9/2010 | Wu ........................ | G08G 1/168 340/932.2 |
| 2010/0238051 A1* | 9/2010 | Suzuki ...................... | B60R 1/00 340/932.2 |
| 2013/0166190 A1* | 6/2013 | Ikeda ................. | B62D 15/0285 701/400 |
| 2014/0081476 A1* | 3/2014 | Verdugo-Lara ........ | G08G 1/168 701/1 |
| 2014/0244070 A1* | 8/2014 | Inagaki .............. | B62D 15/0285 701/1 |
| 2015/0302750 A1* | 10/2015 | Choi ..................... | G08G 1/143 340/932.2 |

\* cited by examiner

F I G . 9
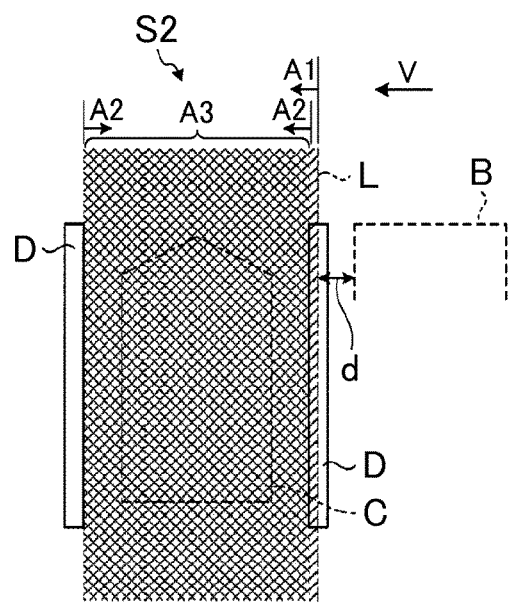
F I G . 10
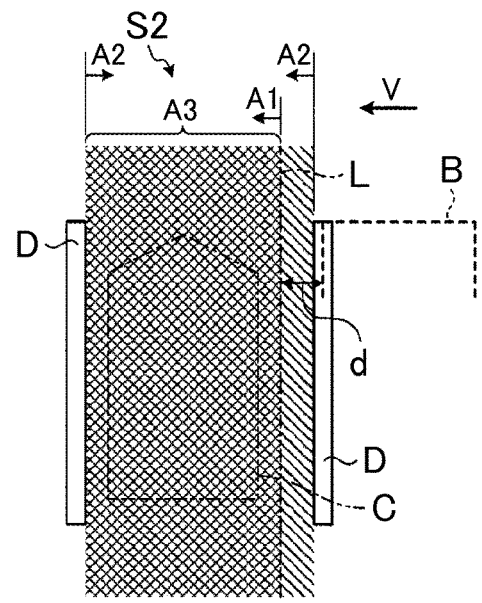

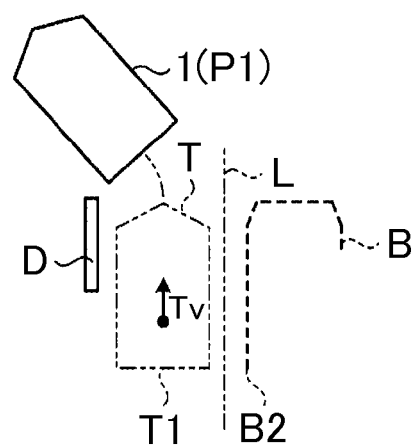
F I G . 15

PARKING ASSIST SYSTEM

INCORPORATION BY REFERENCE

The disclosure of Japanese Patent Application No. 2014-186823 filed on Sep. 12, 2014 including the specification, drawings and abstract is incorporated herein by reference in its entirety.

BACKGROUND OF THE INVENTION

1. Field of the Invention
The invention relates to a parking assist system.
2. Description of Related Art
Generally, there is known a parking assist system that determines a parking target position on the basis of detected results of ultrasonic sensors or captured images (for example, Japanese Patent Application Publication No. 2009-101984 (JP 2009-101984 A)).

SUMMARY OF THE INVENTION

When a target position is determined on the basis of only the detected results of the ultrasonic sensors, the target position may deviate from a parking space. When a target position is determined on the basis of only the images, the target position may be close to an obstacle. Therefore, it may be difficult to determine a target position. For example, it is desirable to obtain a parking assist system that is able to determine a target position at a less inconvenient position.

An aspect of the invention provides a parking assist system. The parking assist system includes an electronic control unit. The electronic control unit is configured to detect an obstacle, detect a boundary of a parking space, determine a target position to which a vehicle moves, and, when the vehicle is allowed to be located in a third area in which a first area and a second area overlap with each other, be allowed to determine the target position in the third area. The first area is an area across a limit line from the obstacle. The limit line is set substantially along an outer periphery of the obstacle at a position spaced a predetermined distance from the obstacle outward of the obstacle. The second area is an area out of the boundary.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 9 is a schematic plan view of further another example of a set candidate position of a target position and an obstacle and parking boundaries detected by the parking assist system according to the embodiment, and is a view in the case where a candidate position is set;

FIG. 10 is a schematic plan view of yet another example of a set candidate position of a target position and an obstacle and parking boundaries detected by the parking assist system according to the embodiment, and is a view in the case where a candidate position is set;

FIG. 15 is a schematic plan view that shows an example of a position of the vehicle, positions of an obstacle and a parking boundary, and a target position in the parking assist system according to the embodiment, and is a view in a state where the vehicle is close to the target position.

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source.

Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
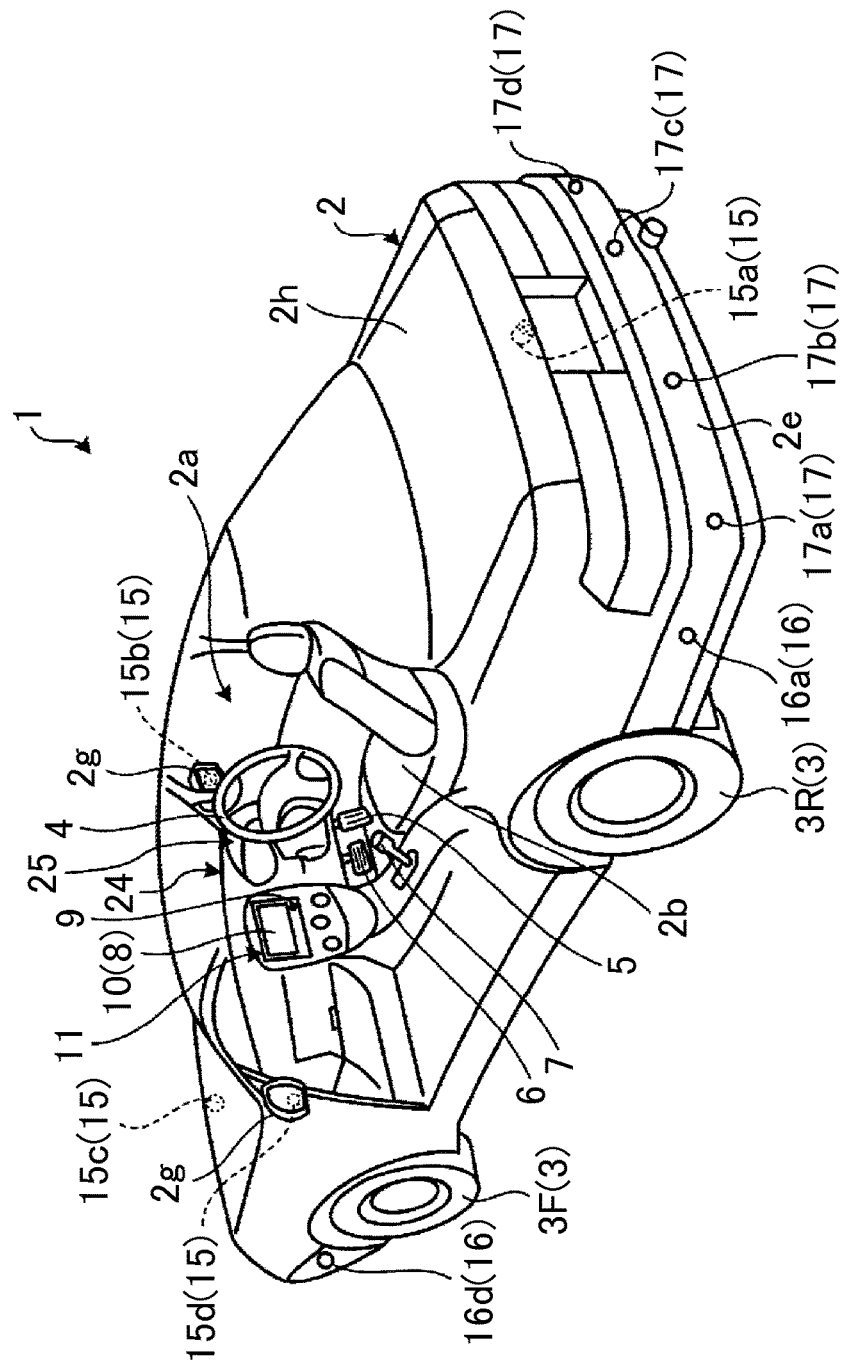

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an operation input by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
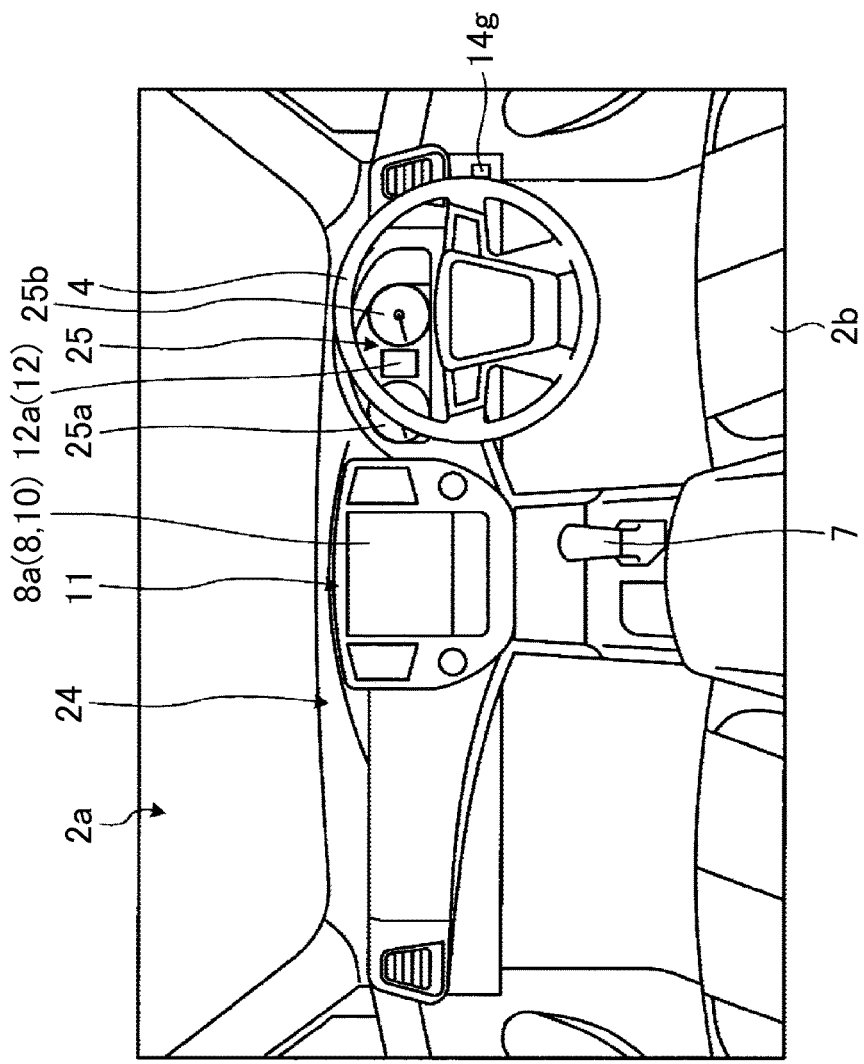
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
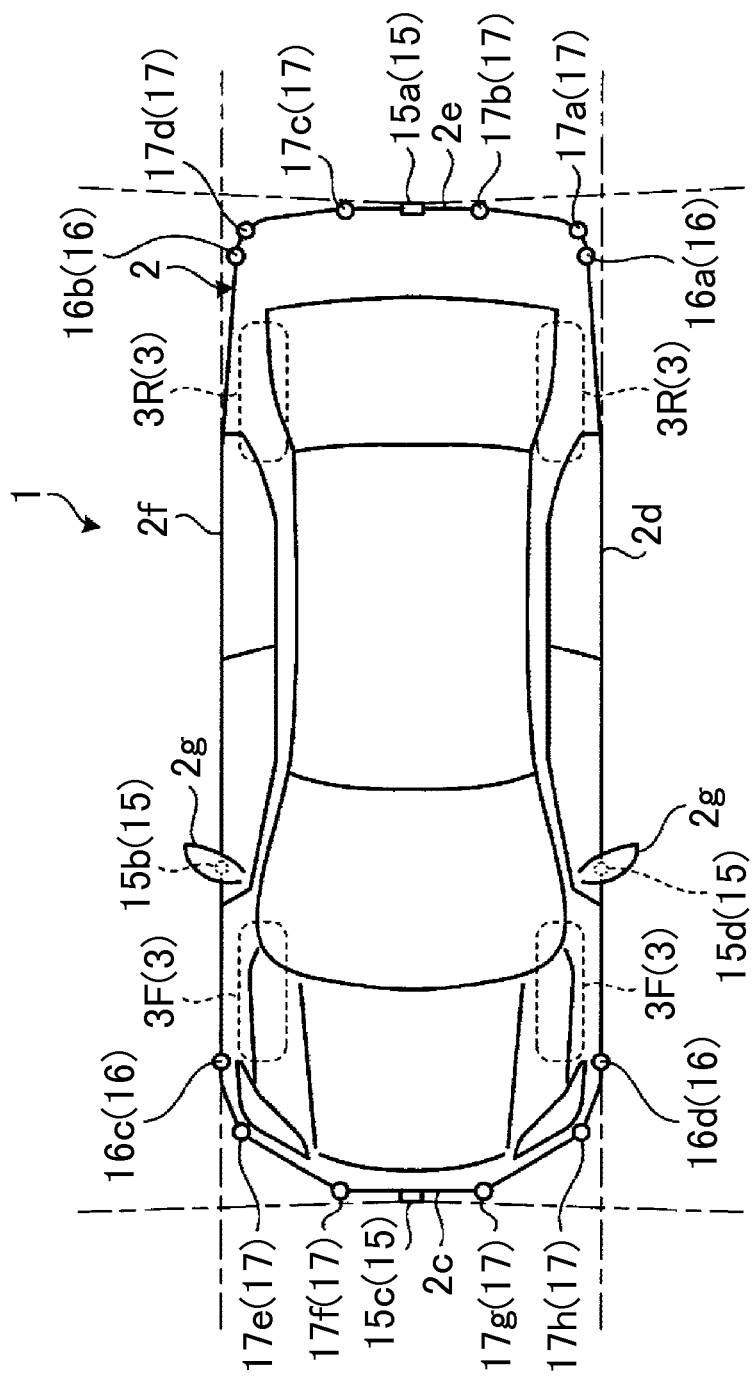
FIG. 2 is an exemplary plan view (bird's-eye view) of the vehicle according to the embodiment.

As illustrated in FIG. 1 and FIG. 2, the vehicle 1 is, for example a four-wheel vehicle, and includes two right and left front wheels 3F and two right and left rear wheels 3R.

Figure 4:
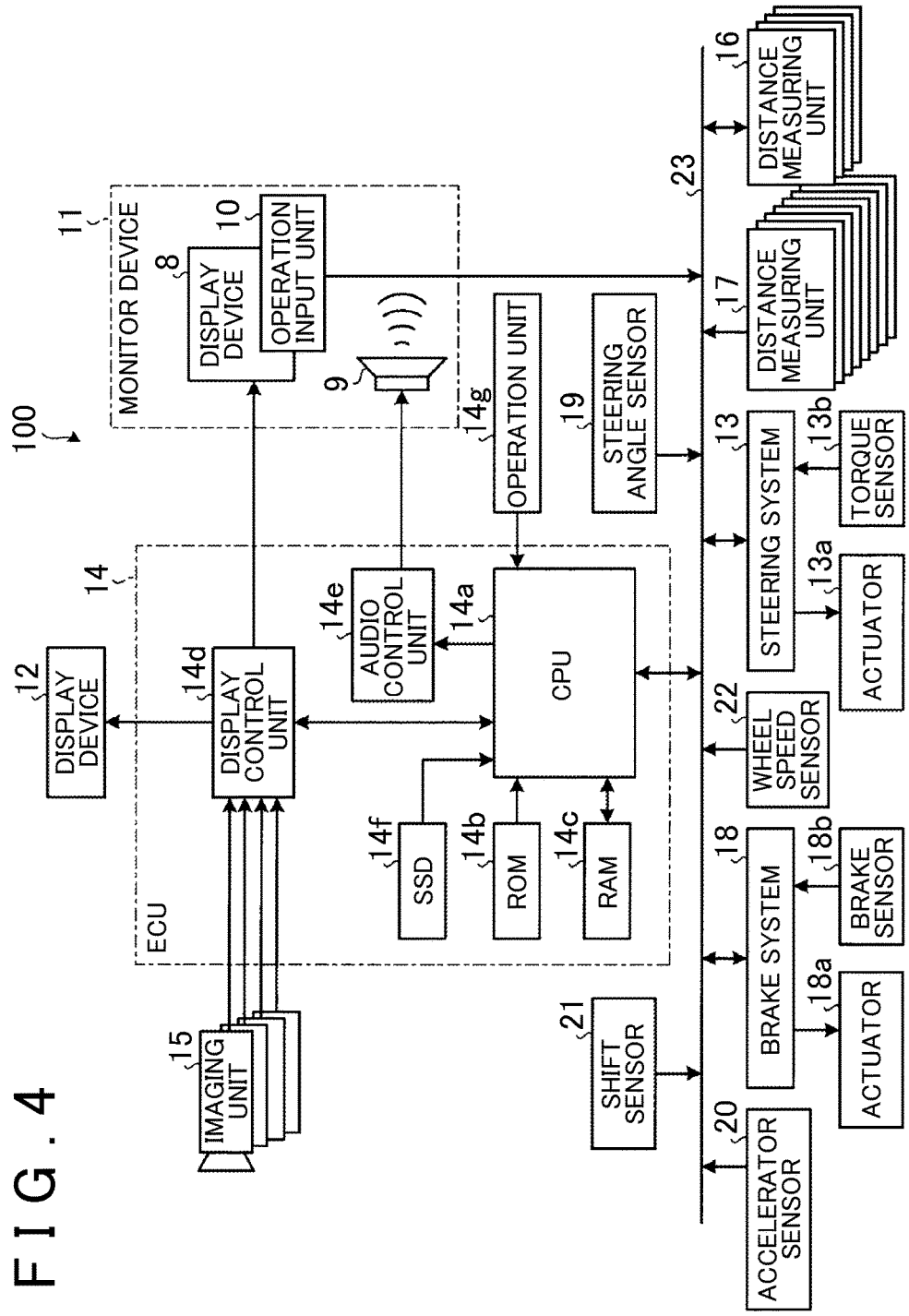
FIG. 4 is an exemplary block diagram of the configuration of a parking assist system according to the embodiment.

Each of these four wheels 3 may be configured to be steerable. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14. The ECU 14 is an example of an electronic control unit of a parking assist system.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
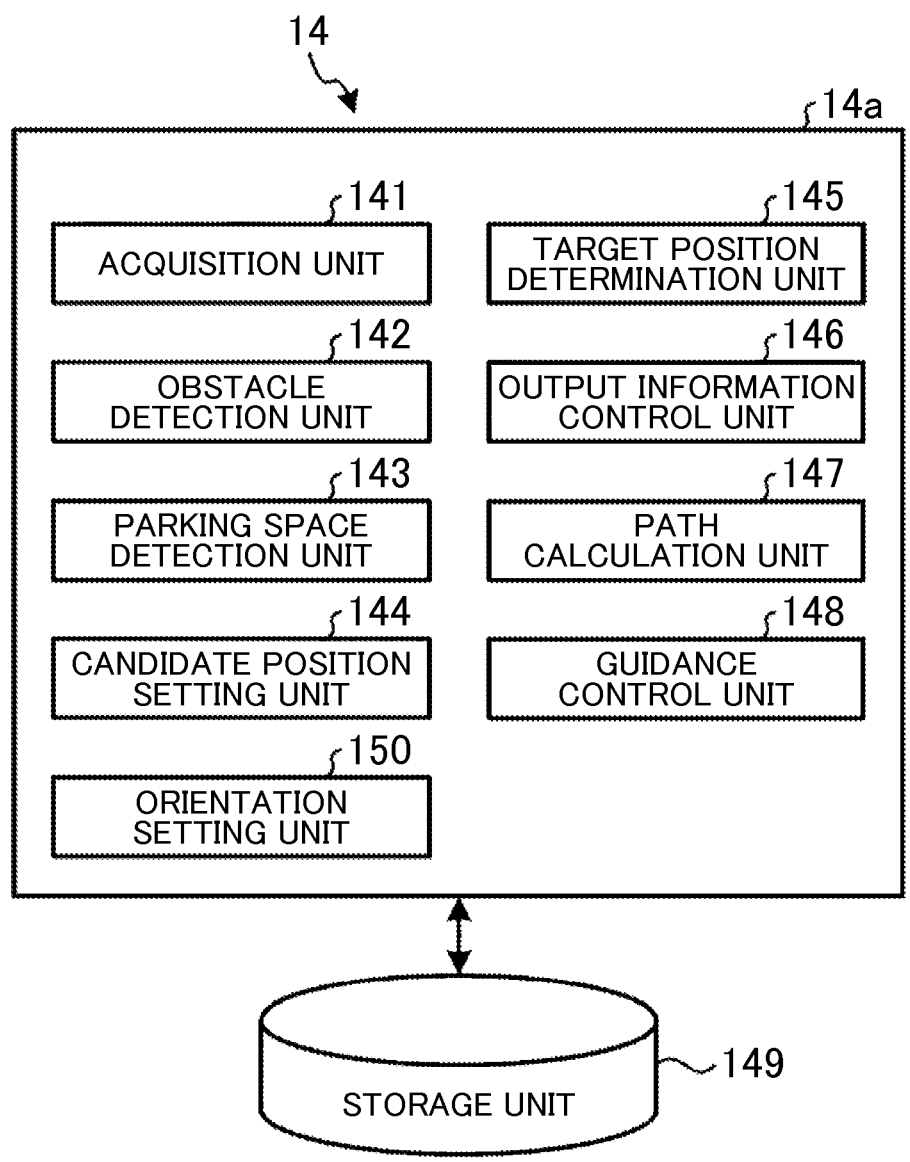
FIG. 5 is an exemplary block diagram of the configuration of part of an ECU of the parking assist system according to the embodiment.

As shown in FIG. 5, the ECU 14 includes an acquisition unit 141, an obstacle detection unit 142, a parking space detection unit 143, a candidate position setting unit 144, a target position determination unit 145, an output information control unit 146, a path calculation unit 147, a guidance control unit 148, an orientation setting unit 150, a storage unit 149, and the like. The CPU 14a functions as the acquisition unit 141, the obstacle detection unit 142, the parking space detection unit 143, the candidate position setting unit 144, the target position determination unit 145, the output information control unit 146, the path calculation unit 147, the guidance control unit 148, the orientation setting unit 150, or the like, by executing a process in accordance with a corresponding program. Data that are used in operation processes of the units, data of results in operation processes, and the like, are stored in the storage unit 149. At least part of the functions of the above-described units may be implemented by hardware.

The acquisition unit 141 acquires various pieces of data, signal, and the like. The acquisition unit 141, for example, acquires data, signals, and the like, such as detected results of the sensors, operation inputs, input commands, and image data. The acquisition unit 141 is able to acquire a signal resulting from an operation input of the operation unit 14g. The operation unit 14g is, for example, a push button, a switch, or the like.

The obstacle detection unit 142 detects an obstacle that interferes with traveling of the vehicle 1. The obstacle is, for example, another vehicle, a wall, a pole, a fence, a protrusion, a step, a sprag, an object, or the like. The obstacle detection unit 142 is able to detect whether there is an obstacle, the height of an obstacle, the size of an obstacle, and the like, by the use of various techniques. The obstacle detection unit 142 is, for example, able to detect an obstacle on the basis of detected results of the distance measuring units 16, 17. Each of the distance measuring units 16, 17 is able to detect an object corresponding to the height of its beam and is not able to detect an object lower than the height of the beam. Thus, the obstacle detection unit 142 is able to detect the height of an obstacle on the basis of the detected results of the distance measuring units 16, 17 and the heights of beams of the distance measuring units 16, 17. The obstacle detection unit 142 may detect whether there is an obstacle or the height of an obstacle on the basis of a detected result of the wheel speed sensor 22 or an acceleration sensor (not shown) and detected results of the distance measuring units 16, 17. The obstacle detection unit 142 may, for example, detect the height of an obstacle through image processing based on images captured by the imaging units 15.

The parking space detection unit 143 detects a parking space that is provided as a mark or an object. The parking space is a space that is a target or reference set such that the vehicle 1 is parked in that place. A parking boundary is a boundary or outer periphery of the parking space, and is, for example, a partition line, a frame line, a straight line, a band, a step, an edge of any one of them, or the like. That is, the parking boundary is a mark, an object, or the like. The parking space detection unit 143 is, for example, able to detect a parking space and a parking boundary through image processing based on images captured by the imaging units 15. The parking space detection unit 143 is an example of a parking boundary detection unit.

The candidate position setting unit 144 sets at least one candidate position that is a candidate for a target position, that is, a terminal position of a moving path of the vehicle 1. The candidate position setting unit 144, for example, sets a candidate position on the basis of at least one of a detected result of the obstacle detection unit 142 or a detected result of the parking space detection unit 143.

The orientation setting unit 150 sets the orientation of the vehicle 1 at each candidate position. The orientation setting unit 150, for example, sets the orientation of the vehicle 1 at a candidate position on the basis of at least one of a detected result of the obstacle detection unit 142 or a detected result of the parking space detection unit 143. When a parking space has been detected, the orientation setting unit 150 sets the orientation on the basis of the parking space.

The target position determination unit 145 determines a target position from among at least one candidate position. The target position determination unit 145 is, for example, able to determine a high-rank candidate position, that is, an upper-level candidate position, as a target position, from among at least one candidate position ranked on the basis of a predetermined condition. The target position determination unit 145 is, for example, able to determine a candidate position corresponding to an occupant's operation input, that is, a candidate position selected by the occupant, as a target position from among at least one candidate position.

The output information control unit 146, for example, controls the display control unit 14d or the audio control unit 14e, by extension, the display device 8, the display device 12 or the audio output device 9, such that the display device 8, the display device 12 or the audio output device 9 outputs intended information in an intended mode at each of steps, such as a start of parking assist, an end of parking assist, determination of a target position, calculation of a path and guidance control.

The path calculation unit 147, for example, calculates a moving path from the current position of the vehicle 1 to the target position on the basis of the current position of the vehicle 1, that is, the host vehicle, the determined target position, the detected obstacle, and the like.

The guidance control unit 148 controls the portions such that the vehicle 1 moves along the calculated moving path. In the vehicle 1 that moves by the use of creeping, or the like, without operating the accelerator pedal, the guidance control unit 148 is, for example, able to move the vehicle 1 along the moving path by controlling the steering system 13 in response to the position of the vehicle 1. The guidance control unit 148 may control not only the steering system 13 but also a drive mechanism, such as an engine and a motor, the brake system 18 that serves as a braking mechanism, or the like. The guidance control unit 148 may, for example, inform the driver of movement of the vehicle 1 along the moving path through display output or audio output commensurate with the position of the vehicle 1 by controlling the output information control unit 146, the display control unit 14d or the audio control unit 14e, by extension, the display device 8, the display device 12 or the audio output device 9.

The storage unit 149 stores data that are used in computation in the ECU 14 or data calculated in computation in the ECU 14.

Figure 6:
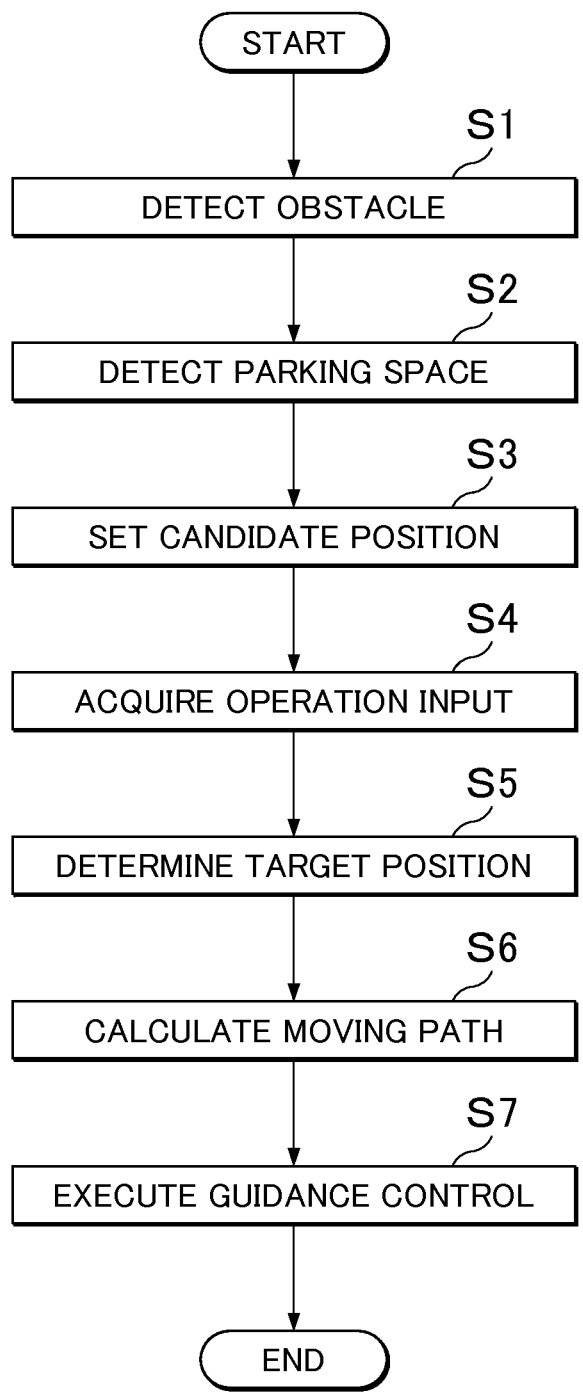
FIG. 6 is a flowchart that shows an example of the procedure of a process that is executed by the parking assist system according to the embodiment.

In the parking assist system 100, a process is executed in accordance with the procedure illustrated in FIG. 6. Initially, the obstacle detection unit 142 detects an obstacle (S1), and the parking space detection unit 143 detects a parking space and a parking boundary (S2). Subsequently, the candidate position setting unit 144 sets at least one candidate position that is a candidate for a target position, that is, terminal position, of the moving path of the vehicle 1 on the basis of the detected results of S1 and S2 (S3). Subsequently, the acquisition unit 141 acquires an operation input that issues a command to start parking assist (S4). That is, in the present embodiment, for example, before an operation command is input, S1 to S3 are executed. Subsequently, the target position determination unit 145 determines a target position from among at least one candidate position (S5). In S5, the target position determination unit 145 is able to rank each of the at least one candidate position, and determine the highest-rank candidate position as the target position. Alternatively, the target position determination unit 145 may determine a candidate position, selected on the basis of an occupant's operation input, as the target position. Subsequently, the path calculation unit 147 calculates a moving path from the current position of the vehicle 1 to the determined target position (S6). Subsequently, the guidance control unit 148 controls the portions such that the vehicle 1 moves along the calculated moving path (S7). The target position, the moving path, or the like, may be corrected or updated as needed in the middle of movement of the vehicle 1 along the moving path.

Next, an example of setting of a candidate position C by the candidate position setting unit 144 according to the present embodiment will be described with reference to FIG. 7 to FIG. 12. FIG. 7 to FIG. 12 are exemplary schematic views of detected obstacles B and parking boundaries D and a candidate position C on a two-dimensional coordinate system. FIG. 7 to FIG. 12 illustrate detected results obtained at the time when the vehicle 1 passes by the front of the obstacles B and the parking boundaries D in the leftward direction (traveling direction V) of each drawing in a place in which a plurality of parking spaces in which the vehicle 1 is double parked in position in which the vehicle front is oriented upward in each drawing are set. The two-dimensional coordinate system is, for example, a coordinate system along a road surface with an origin set at the host vehicle.

The target position determination unit 145 determines a target position from among at least one candidate position C set by the candidate position setting unit 144. That is, the target position determination unit 145 is able to determine a position set for the candidate position C as a target position but the target position determination unit 145 is not able to determine a position not set for the candidate position C as a target position. Thus, the following condition for setting a candidate position C is also a condition for setting a target position.

Part of an outer surface of an obstacle B facing the traveling vehicle 1 is detected by the distance measuring units 16. As described above, FIG. 7 to FIG. 12 show detected results at the time when the vehicle 1 passes by the upper side of each drawing in the leftward direction (traveling direction V), so the obstacle B is, for example, detected in a downward-open inverted U shape in each drawing. The parking boundary D is detected from image data captured by the imaging units 15. An image of each parking boundary D is detected as a linear or band-shaped area. Detected results vary depending on settings of the distance measuring units 16, 17 and imaging units 15.

Figure 7:
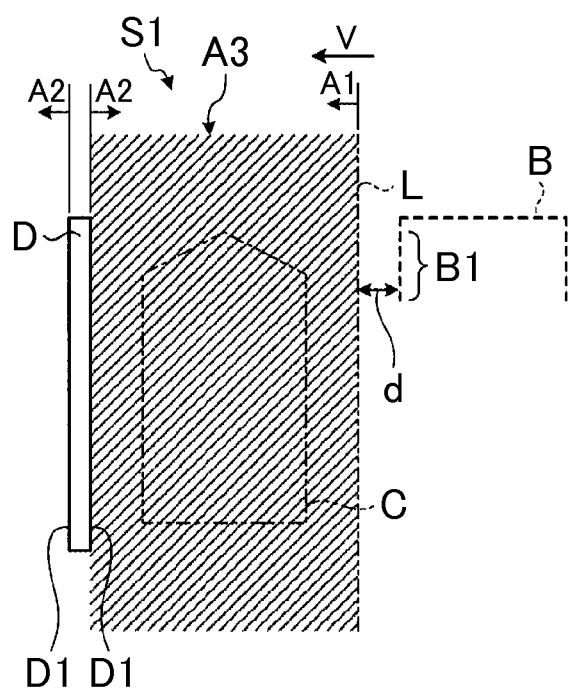
FIG. 7 is a schematic plan view of an example of a set candidate position of a target position and an obstacle and parking boundary detected by the parking assist system according to the embodiment, and is a view in the case where a candidate position is set.
Figure 8:
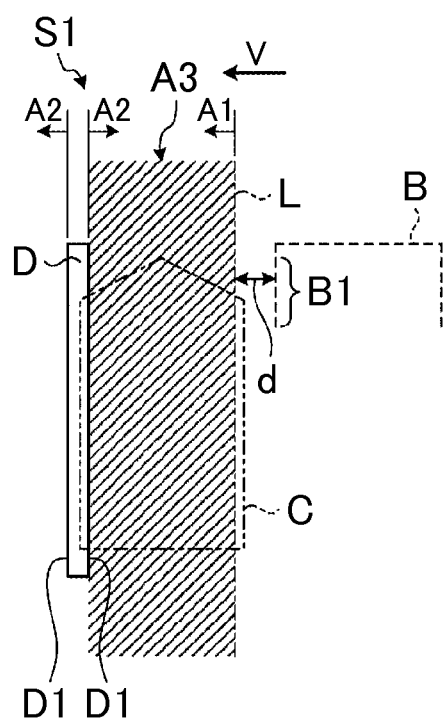
FIG. 8 is a schematic plan view of another example of a set candidate position of a target position and an obstacle and parking boundary detected by the parking assist system according to the embodiment, and is a view in the case where no candidate position is set.

As illustrated in FIG. 7 and FIG. 8, around the obstacle B, a limit line L is set substantially along the outer periphery of the obstacle B at a position spaced a predetermined distance d from the outer periphery of the obstacle B. The limit line L is, for example, a straight line, and is set in correspondence with a section B1 of the obstacle B, extending in a direction that intersects with the traveling direction V of the traveling vehicle 1 and spaced apart from the corner. The limit line L may be, for example, obtained through regression analysis, such as a method of least squares, on the section B1. That is, the limit line L extends in the direction that intersects with the traveling direction V of the traveling vehicle 1. The limit line L is not limited to a straight line. The candidate position C is set on a side across the limit line L from the obstacle B, and is not set on the obstacle B side of the limit line L. The candidate position setting unit 144 is able to identify an area across the limit line L from the obstacle B on the basis of a detected position of the obstacle B and a position (coordinates) of the limit line L. By such settings, at least a certain distance, that is, a clearance, is ensured between the obstacle B and the vehicle 1 located at the candidate position C.

The candidate position setting unit 144 sets a candidate position C such that the candidate position C does not overlap with the parking boundary D. That is, a candidate position C is set in an area that does not overlap with the parking boundary D, that is, an area out of the parking boundary D, within an intended area (an area allowed to be set).

As illustrated in FIG. 7 and FIG. 8, for a space S1 adjacent to one side of the obstacle B and in which one parking boundary D is detected, the candidate position setting unit 144 determines whether a candidate position C is allowed to be set in a third area A3 between the limit line L and the parking boundary D. The third area A3 is an area in which a first area A1 and a second area A2 overlap with each other. The first area A1 is an area across the limit line L from the obstacle B. The second area A2 is an area out of the parking boundary D. The second area A2 is also regarded as an area across one of boundary lines D1 from the parking boundary D. The boundary lines D1 extend in the longitudinal direction of the parking boundary D along end edges of the parking boundary D in the width direction (transverse direction in FIG. 7 and FIG. 8). The second area A2 is an area other than the detected parking boundary D, an area that does not overlap with the parking boundary D, an area on one side or the other side of the parking boundary D in the transverse direction, that is, the width direction, and an area outside of the parking boundary D.

In the example shown in FIG. 7, the size of the third area A3 is larger than the size of the vehicle at the candidate position C. Thus, the candidate position setting unit 144 sets a candidate position C in the third area A3 shown in FIG. 7. On the other hand, in the example shown in FIG. 8, the size of the third area A3 is smaller than the size of the vehicle at the candidate position C. Thus, the candidate position setting unit 144 does not set a candidate position C in the third area A3 shown in FIG. 8.

The candidate position setting unit 144, for example, sets a candidate position C in the vehicle width direction of the candidate position C such that the candidate position C is located at the center of the third area A3. The candidate position setting unit 144, for example, sets a candidate position C in the vehicle longitudinal direction of the candidate position C such that the candidate position C is located at the center between ends of the parking boundary D in the longitudinal direction. A manner of setting a candidate position C in the third area A3 is not limited to this example. For example, the front end of the candidate position C and the front end of the parking boundary D may be aligned in the vehicle longitudinal direction at the candidate position. The vehicle longitudinal direction at the candidate position may be set to the longitudinal direction of the parking boundary D.

FIG. 9 and FIG. 10 illustrate a space S2 adjacent to an obstacle B and in which mutually spaced two parking boundaries D are detected. In this case as well, the candidate position setting unit 144 determines for the obstacle B and the parking boundaries D detected in the space S2 whether a candidate position C is allowed to be set in the third area A3 in which the first area A1 and the second area A2 overlap with each other. The first area is an area across the limit line L from the obstacle B. The second area A2 is an area outside of the parking boundaries D. In the example shown in FIG. 9, the third area A3 is between the two parking boundaries D. In the example shown in FIG. 10, the third area A3 is between the left-side parking boundary D in the drawing and the limit line L.

In the example shown in FIG. 9, the obstacle B is relatively distant from the right-side parking boundary D in FIG. 9, and the size of the third area A3 is larger than the size of the vehicle at the candidate position C. Thus, the candidate position setting unit 144 sets a candidate position C in the third area A3 in FIG. 9. In the example shown in FIG. 10, the obstacle B overlaps with the right-side parking boundary D; however, the size of the third area A3 between the left-side parking boundary D and the limit line L is larger than the size of the vehicle at the candidate position C. Thus, the candidate position setting unit 144 sets a candidate position C in the third area A3 in FIG. 10.

Figure 11:
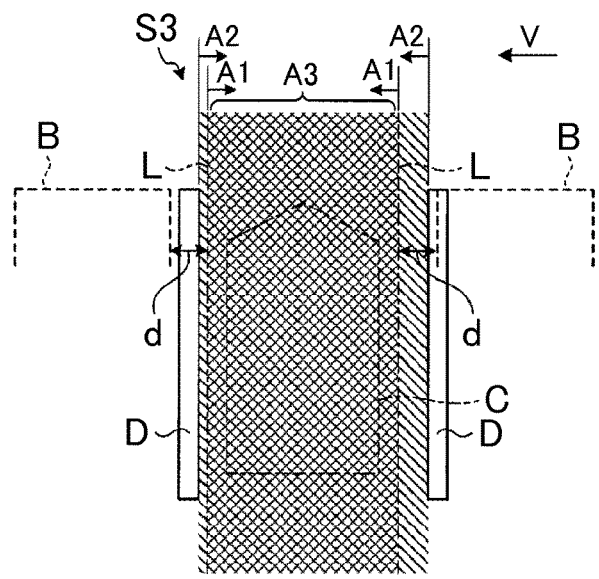
FIG. 11 is a schematic plan view of further another example of a set candidate position of a target position and obstacles and parking boundaries detected by the parking assist system according to the embodiment, and is a view in the case where a candidate position is set.
Figure 12:
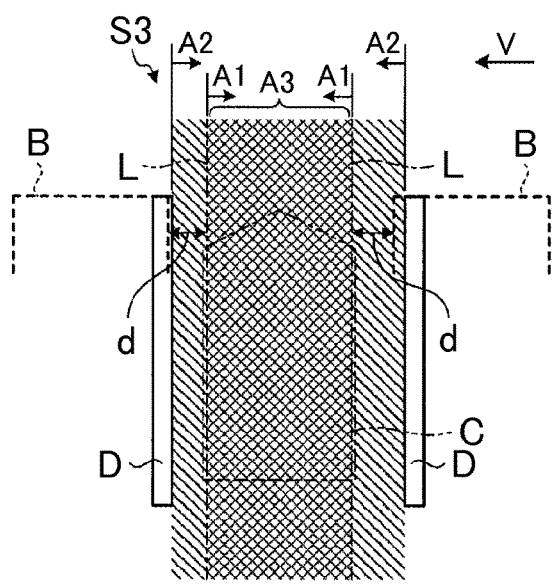
FIG. 12 is a schematic plan view of further another example of a set candidate position of a target position and obstacles and parking boundaries detected by the parking assist system according to the embodiment, and is a view in the case where no candidate position is set.

FIG. 11 and FIG. 12 illustrate a space S3 between two obstacles B and in which mutually spaced two parking boundaries D are detected. In this case as well, the candidate position setting unit 144 determines for the obstacles B and parking boundaries D detected in the space S3 whether a candidate position C is allowed to be set in the third area A3 in which the first area A1 and the second area A2 overlap with each other. The first area A1 is an area across each limit line L from the corresponding obstacle B. The second area A2 is an area outside of the parking boundaries D. In the examples shown in FIG. 11 and FIG. 12, the third area A3 is between the two limit lines L.

In the example shown in FIG. 11, the size of the third area A3 is larger than the size of the vehicle at the candidate position C. Thus, the candidate position setting unit 144 sets a candidate position C in the third area A3 in FIG. 11. On the other hand, in the example shown in FIG. 12, one of the obstacles B overlaps with the right-side parking boundary D, and the size of the third area A3 is smaller than the size of the vehicle at the candidate position C. Thus, the candidate position setting unit 144 does not set a candidate position C in the third area A3 in FIG. 12.

Figure 13:
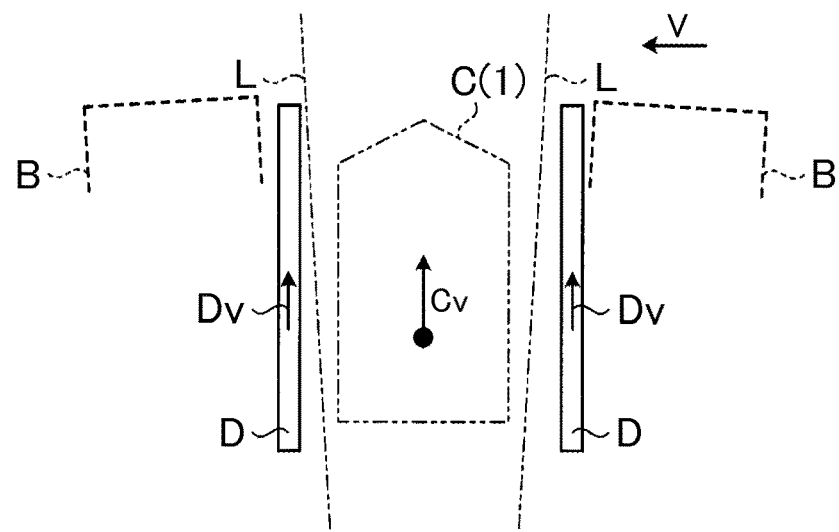
FIG. 13 is a schematic plan view of an example of a set candidate position of a target position and obstacles and parking boundaries detected by the parking assist system according to the embodiment, and is a view that shows an example of an orientation of a vehicle at a candidate position.

Next, an example of setting of an orientation of the vehicle 1 at the candidate position C by the orientation setting unit 150 according to the present embodiment will be described with reference to FIG. 13. FIG. 13 is an exemplary schematic view of detected obstacles B and parking boundaries D and a candidate position C on a two-dimensional coordinate system. FIG. 13 illustrates detected results obtained at the time when the vehicle 1 passes by the front of the obstacles B and the parking boundaries D in the leftward direction (traveling direction V) of FIG. 13 in a place in which a plurality of parking spaces in which the vehicle 1 is double parked in position in which the vehicle front is oriented upward in FIG. 13 are set.

The orientation setting unit 150 sets the orientation Cv of the vehicle 1 at the candidate position C on the basis of one or a plurality of parking boundaries D. The orientation Cv is, for example, the forward side of the vehicle 1 located at the candidate position C. For example, when only one parking boundary D is detected, the orientation setting unit 150 sets the orientation Cv parallel to the direction in which the one parking boundary D extends; when two parking boundaries D are detected, the orientation setting unit 150 sets the orientation Cv to a direction between directions Dv in which the two parking boundaries D respectively extend. For example, when angles of the two directions Dv with respect to a reference direction are $\alpha 1$, $\alpha 2$, an angle $\beta$ of the orientation Cv with respect to the reference direction is set to $(\alpha 1 + \alpha 2)/2$. When no parking boundary D has been detected, the orientation setting unit 150 sets the orientation Cv to a direction between directions of two limit lines L or a direction parallel to a direction of one limit line L. Each direction Dv is, for example, obtained through regression analysis, such as a method of least squares, on each detected parking boundary D.

Figure 14:
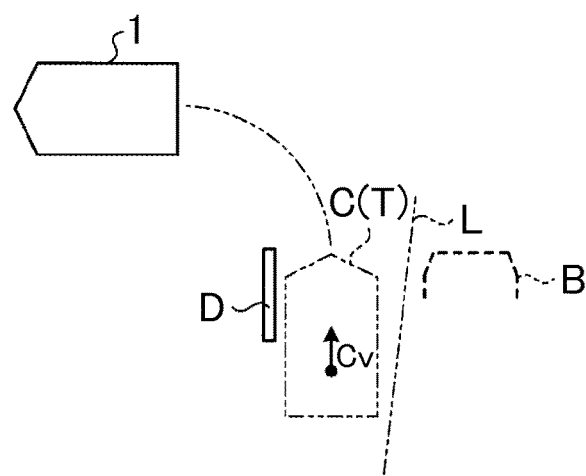
FIG. 14 is a schematic plan view that shows an example of a position of the vehicle, positions of an obstacle and a parking boundary, and a target position in the parking assist system according to the embodiment, and is a view in a state where the vehicle is distant from the target position.

As illustrated in FIG. 14 and FIG. 15, the target position determination unit 145 is able to change the target position T in the middle of movement of the vehicle 1 along the moving path. In FIG. 14, the target position T is a candidate position C. As illustrated in FIG. 15, when the vehicle 1 moves backward along the moving path and becomes close to the target position T, the vehicle 1 is close to an obstacle B near the target position T or a parking boundary D (parking space), so a detection range or detection accuracy of an obstacle B or a parking boundary D improves. At a position P1 in FIG. 15, the imaging unit 15a or distance measuring units 17 provided at the rear of the vehicle body 2 as illustrated in FIG. 1 and FIG. 2 are further accurately used as compared to the position in FIG. 14. Thus, the target position determination unit 145 may update the target position T and the orientation Cv of the vehicle 1 at the target position T through a similar computation to that of the candidate position setting unit 144 on the basis of a detected obstacle B or parking boundary D at the position P1 in the middle of movement of the vehicle 1.

As shown in FIG. 15, at the position P1, a rear end B2 of the obstacle B is detected, so the target position determination unit 145 is allowed to align a rear end T1 of the target position T and the rear end B2 of the obstacle B with each other in the vehicle longitudinal direction. Specifically, the target position determination unit 145, for example, updates the target position T such that the rear end T1 of the target position T and the rear end B2 of the obstacle B are arranged next to each other in the vehicle width direction. In a state where the vehicle 1 is close to the target position T, the target position T of the vehicle 1 may be updated on the basis of the detected obstacles B by the distance measuring units 16a, 16b provided at the side of the vehicle body 2 as illustrated in FIG. 1 and FIG. 2. Such control is, for example, effective when a parking boundary D is short and located in correspondence with the front side of a parking space and the parking boundary D has no portion corresponding to the rear side of the parking space.

As described above, in the present embodiment, for example, for all the obstacles B and all the parking boundaries D detected in the spaces S1 to S3, when the vehicle 1 is allowed to be located in the third area A3 in which the first area A1 and the second area A2 overlap with each other, the candidate position setting unit 144 sets a target position T in the third area A3. The first area A1 is an area across each limit line L from the corresponding obstacle B. Each limit line L is set substantially along the outer periphery of the corresponding obstacle B at a position spaced the predetermined distance d from each obstacle B outward of the obstacle B. The second area A2 is an area out of the parking boundaries D. Thus, in this case, the target position determination unit 145 is allowed to determine the target position T in the third area A3. Thus, according to the present embodiment, for example, it is possible to determine a target position T at a position that is spaced apart from an obstacle B and that falls within a parking space. That is, the target position determination unit 145 is able to determine a less inconvenient position as a target position.

In the present embodiment, for example, the orientation setting unit 150 sets a candidate position C, that is, an orientation Cv of the vehicle 1 at a target position T, on the basis of a parking boundary D. Thus, according to the present embodiment, for example, the orientation of the vehicle 1 at the target position T tends to match with the parking space.

In the present embodiment, for example, the target position determination unit 145 is able to update the target position T on the basis of at least one of a detected obstacle B or a detected parking boundary D in the middle of movement of the vehicle 1 to the target position T. Thus, for example, the target position T further tends to match with the obstacle B or the parking space.

The embodiment of the invention is illustrated above; however, the above-described embodiment is illustrative, and is not intended to limit the scope of the invention. The embodiment may be implemented in other various forms, and may be variously omitted, replaced, combined or changed without departing from the spirit of the invention. The components and shapes of each embodiment may be partially replaced. The specifications (structure, type, orientation, shape, size, length, width, height, number, arrangement, position, and the like) of each component, or the like, may be changed as needed. The invention is applicable to parking assist in parking places and parking spaces in various forms. The way of detecting or the way of setting the position and orientation of the vehicle and the candidate position and its orientation, bases for the position and orientation of the vehicle and the candidate position and its orientation, or the like, may be variously set or changed. An input signal may be based on an audio input to a microphone.

The parking assist system according to the above-described embodiment, for example, includes an obstacle detection unit 142 that detects an obstacle B, a parking space detection unit 143 that detects a boundary D of a parking space and a target position determination unit 145 that determines a target position to which a vehicle 1 moves. When the vehicle 1 is allowed to be located in a third area A3 in which a first area A1 and a second area A2 overlap with each other, the target position determination unit 145 is allowed to determine the target position in the third area A3. The first area A1 is an area across a limit line L from the obstacle B. The limit line L is set substantially along an outer periphery of the obstacle B at a position spaced a predetermined distance from the obstacle B outward of the obstacle B. The second area A2 is an area out of the boundary D. Thus, with the parking assist system according to the embodiment, for example, a target position may be determined at a position that is spaced apart from an obstacle B and that falls within a parking space.

The parking assist system, for example, includes an orientation setting unit 150 that sets an orientation Cv of the vehicle at the target position on the basis of the boundary D. Thus, for example, the orientation of the vehicle 1 at the target position tends to match with the parking space.

In the parking assist system, for example, the target position determination unit 145 is able to update the target position on the basis of at least one of the detected obstacle B or the detected boundary D in the middle of movement of the vehicle 1 to the target position. Thus, for example, the target position further tends to match with the obstacle B or the parking space.

What is claimed is:

1. A parking assist system comprising:
an obstacle detection unit configured to detect an obstacle,
a parking boundary detection unit configured to detect at least one boundary line of a parking space,
a candidate position setting unit configured to set a candidate position that is a candidate for a target position to which a vehicle moves by
  setting an imaginary limit line at a location at a position spaced a predetermined distance from the obstacle, the limit line extending along an outer periphery of the obstacle,
  setting a first area, the first area extending from the imaginary limit line toward a direction away from the obstacle,
  setting a second area; wherein when the at least one boundary line comprises two boundary lines, the second area extends from one boundary line to another boundary line; and when the at least one boundary line comprises a single boundary line, the second area extends from the single boundary line in a direction toward the obstacle,
  determining a third area, the third area being an area in which the first area completely overlaps the second area, and
  setting the candidate position in the third area when the size of the third area is larger than the size of the vehicle, and not setting the candidate position in the third area when the size of the third area is smaller than the size of the vehicle; and
a target position determination unit configured to determine a target position to which a vehicle moves from the candidate position set by the candidate position setting unit.

2. The parking assist system according to claim 1, wherein the electronic control unit is configured to set an orientation of the vehicle at the target position on a basis of the boundary line.

3. The parking assist system according to claim 1, wherein the electronic control unit is configured to be able to update the target position on a basis of at least one of the detected obstacle or the detected boundary line in a middle of movement of the vehicle to the target position.

4. The parking assist system according to claim 2, wherein the electronic control unit is configured to be able to update the target position on a basis of at least one of the detected obstacle or the detected boundary line in a middle of movement of the vehicle to the target position.

* * * * *